Feb. 24, 1970  H. L. STRAITWELL, JR  3,497,035
ALTERNATING ABSORPTION AND DISPERSION VALVE
Filed Nov. 9, 1967  3 Sheets-Sheet 1

INVENTOR.
HAROLD L. STRAITWELL, Jr.
BY John Stelmah
ATTORNEY

INVENTOR.
HAROLD L. STRAITWELL, Jr.
BY John Stelmak

ATTORNEY

3,497,035
ALTERNATING ABSORPTION AND
DISPERSION VALVE
Harold L. Straitwell, Jr., 9484 Church Road,
Gross Ile, Mich. 43138
Filed Nov. 9, 1967, Ser. No. 681,750
Int. Cl. F16n 25/02
U.S. Cl. 184—7                                    19 Claims

ABSTRACT OF THE DISCLOSURE

A valve which receives lubricant in one chamber of a variable volume cylinder while simultaneously dispersing lubricant from another chamber of the cylinder. Two pairs of co-axially pistons abutted end to end move within the cylinder. The two chambers are ported to inlet and outlet ports of the valve and alternately function as absorption and dispersion chambers.

---

Figure 1:
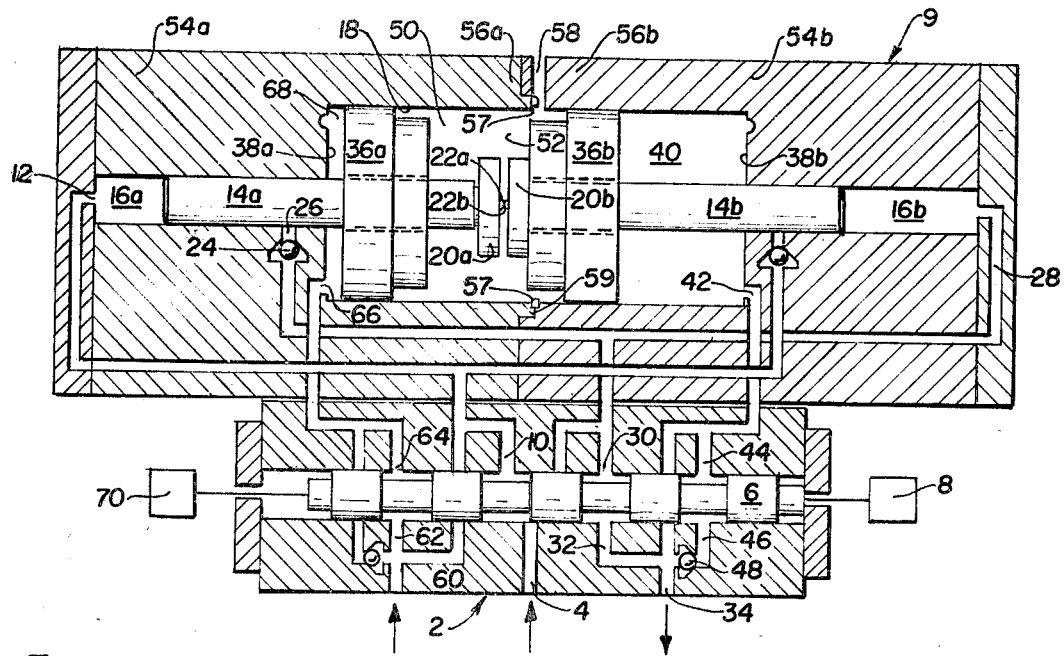

This invention relates to hydraulic valves and more particularly to a valve adapted for use with large power driven multi-line pressurized lubricant dispensing systems, one type being a Dualine lubricant dispensing system. (For convenience, a multi-line lubricant dispensing system is referred to herein as a "Dualine" system.

A Dualine lubrication system is a positive mechanical method of delivering oil and grease under pressure to a group of bearings from one centrally located pumping unit in exact measured quantities and as often as desired. A Dualine lubrication system ordinarily comprises a reservoir, motor, geared reduction unit, pump, flow reversing valve, two main supply lines and a Dualine measuring valve for each bearing. Lubricant is pumped alternately into first one and then the other of the two supply lines as determined by the flow directing reversing valve. The pressure differential between the two system supply lines, one of which is under pressure while the other is in relief back to the reservoir of the pumping unit, causes the Dualine measuring valves to discharge in exact quantity of lubricant to the connected bearings.

The Dualine measuring valves consist of two pistons for each bearing feeder. Lubricant from the active, pressurized system supply line enters the measuring valve causing the inlet or pilot piston to shift. The incoming lubricant is thus ported to one end of the measuring or discharge piston thereby causing the measuring piston to shift. The movement of the measuring piston causes lubricant beyond this piston to be displaced and discharged from the valve to the bearing. The displacement of the inlet piston returns a small amount of lubricant to the system reservoir at each valve operation through the relieving system supply line.

It is desirable to operate many individual Dualine type lubricant dispensing systems from a single utility lubricant supply line. The utility lubricant supply line concept offers the consumer multiple benefits in lubricant handling and equipment costs. Under present practice, however, a pump and reservoir station must be operated with each Dualine system to receive and discharge that quantity of lubricant which is displaced through the relieving system supply line.

The present invention is designed to eliminate the need for individual pump and reservoir stations for each Dualine lubrication system installation. The invention receives and retains that quantity of displaced lubricant from the relief line in an absorption chamber while simultaneously discharging lubricant absorbed during a previous operation of the valve when the chamber was functioning as an absorption chamber.

I provide a valve body preferably comprised of left and right body members having recesses formed therein and joined at their open ends. I further provide a chamber having varying cross-sections perpendicular to the axis of the piston movement. I provide a porting connecting the chamber with spaced inlet and outlet ports in the valve body. I prefer to employ a pair of shoulder pistons slidably positioned on a common axis within portions of the chamber having a smaller cross-section. I further prefer to employ a pair of chamber pistons slidably positioned within the portion of the chamber having a larger cross-section, each such chamber piston being co-axially slidable upon a shoulder piston.

In the preferred form of my invention, the chamber comprises a main cylinder having venting means to the atmosphere and two opposed bores of lesser cross-section than the main cylinder extending outwardly on the axis of the main cylinder. I further prefer to provide porting comprising a plurality of passages inter-connecting the remote ends of each bore with an intermediate point in its opposed bore, each said passage being connected to spaced inlet and outlet ports in the valve body and a plurality of passages connecting the main cylinder with other spaced inlet and outlet ports in the valve body. I further prefer to provide closure means suitably disposed within the porting. In the preferred form of my invention the closure means comprises a plurality of ball check valves.

I further prefer to provide a pair of shoulder pistons each having an enlargement formed in one end and slidably disposed within the bores whereby the enlarged ends may abut end to end. In the preferred form of my invention the enlargement formed in one end of each shoulder piston comprises a flange member having a ball-shaped protrusion connected to the central portion of its outer side. I further prefer to employ a pair of chamber pistons slidably disposed within them ain chamber, each said chamber piston being co-axially fitted on a shoulder piston whereby the sliding movement of each chamber piston is restricted in one direction by the enlarged portion of its associated shoulder piston and in the other direction by the main chamber wall.

I further provide the combination comprising an alternating absorption and dispersion valve having spaced inlet and outlet ports and a flow reversing valve operatively connected to said spaced ports whereby the flow of lubricant to the absorption and dispersion valve may be selectively controlled.

I further provide the combination comprising a multi-line pressure lubricant dispensing system having a lubricant feed line and at least one lubircant dispensing line, an alternating absorption and dispersion valve having spaced inlet and outlet ports and a flow reversing valve operatively connected between said inlet and outlet ports and each line of the system.

Other details, objects and advantages of the invention will become apparent as the following description of a present preferred embodiment thereof proceeds.

In the accompanying drawings I have shown a present preferred embodiment of the invention in which:

FIGURES 1 through 5 are a series of sectional views of the invention in combination with a solenoid operated, two position flow reversing valve, with parts in elevation and parts in cross-section and illustrating the operating sequence of the invention.

Referring to the drawings, it will be observed that in FIGURE 1 pressurized lubricant from the utility supply line (not shown) enters the reversing valve 2 at the lubricant inlet 4. The reversing valve spool 6 is held to the right by the right solenoid 8. Lubricant is directed into the alternating absorption and dispersion valve 9 through ports 10 and 12 to force shoulder piston 14a to the right. Shoulder piston 14a is one of a pair of shoulder piston 14a and 14b closely slidable within bores 16a and 16b which extend outwardly on a common axis from the main cylinder 18 of my invention. Shoulder pistons 14a and 14b each have an enlargement 20a and 20b formed in one end, said enlargements 20a and 20b being in the general configuration of a flange. A ball-shaped protrusion 22a, integral with the central portion of the outside of enlargement 20a abuts a similar protrusion 22b on the enlargement 20b, when these pistons 14a and 14b are in contact. As shoulder piston 14a is being forced to the right, ball check valve 24 stops lubricant flow toward port 26. Shoulder piston 14a exerts force against shoulder piston 14b which displaces lubricant ahead of shoulder piston 14b through ports 28, 30 and 32 to active system supply line 34. Check valve 48 prevents this lubricant from entering ports 46, 44, 42 and dispersion chamber 40.

Shoulder piston 14b also exerts force against chamber piston 36b which is one of a pair of chamber pistons 36a and 36b which are closely slidable within main cylinder 18. Each chamber piston 36a and 36b is co-axially slidable upon each of shoulder pistons 14a and 14b. Chamber pistons 36a and 36b are capable of movement independent of their associated shoulder pistons 14a and 14b but such movement is restricted in one direction by enlargements 20a and 20b and in the other direction by the walls 38a and 38b of main cylinder 18. The exertion of force by shoulder piston 14b against chamber piston 36b displaces lubricant from dispersion chamber 40 through ports 42, 44 and 46 and check valve 48 to active system supply line 34.

Air breather chamber 50 is a sub chamber within the chamber 52 formed by joining left and right body members 54a and 54b together at their open ends 56a and 56b. Main cylinder 18 is provided with a maximum travel limit ring 57 at the joint 59. Its function is to prevent either chamber piston 36a or 36b from moving beyond the mid-point of the cylinder 18. Air breather chamber 50 is self-relieving through port 58 and a porous air filter (not shown).

System supply line 60 is in relief and lubricant displaced by the movement of the inlet or pilot pistons (not shown) of the system measuring valves (not shown) enters the reversing valve 2 at line 60 and passes through ports 62, 64 and 66 to enter absorption chamber 68.

Figure 2:
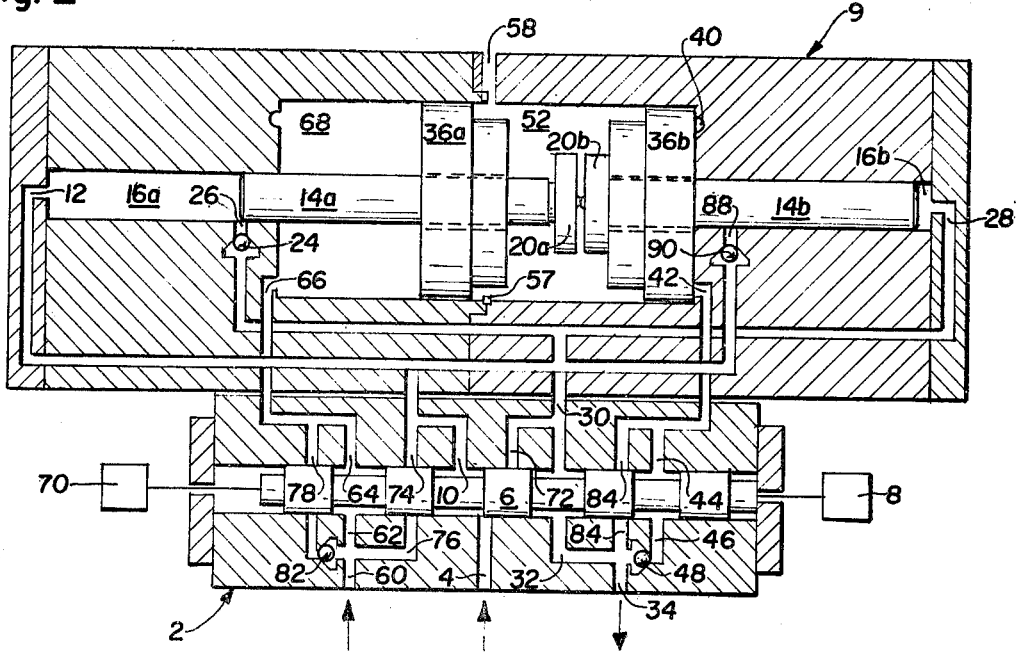

Referring to FIGURE 2, it will be observed that the continued force of lubricant from the utility supply line moves pistons 14a, 14b and 36b to the extreme right completing the displacement of lubricant from dispersion chamber 40 and from bore 16b. Shoulder piston 14a has now exposed port 26.

Utility supply lubricant is now permitted to flow through port 26, past check valve 24 and through ports 30 and 32 to active system supply line 34. The pressurized lubricant is also permitted to flow through port 28 into bore 16b to bring force against shoulder piston 14b. However, this force is countered by an equal force continued against shoulder piston 14a and thus, shoulder pistons 14a and 14b remain in their extreme right positions. Port 26 remains open and lubricant continues to bypass directly to system supply line 34. The pressurized lubricant flow is stopped by check valve 48 from entering ports 42, 44, 46 and dispersion chamber 40. Lubricant flow to line 34 continues to service the Dualine measuring valves in the system (not shown) and their related bearing points. Line 60 remains in relief and displaced lubricant continues to flow into absorpton chamber 68 moving chamber piston 36a further to the right. The travel of chamber poiston 36a to the right is limited by the quantity of lubricant displaced from contraction of lubricant supply lines (not shown) and by the displaced lubricant from the system measuring valve pilot pistons (not shown). After the pressure in active system supply line 34 has reached a value high enough to insure the satisfactory operation of all the Dualine measuring valves in the system, the reversing valve 2 operates.

Figure 3:
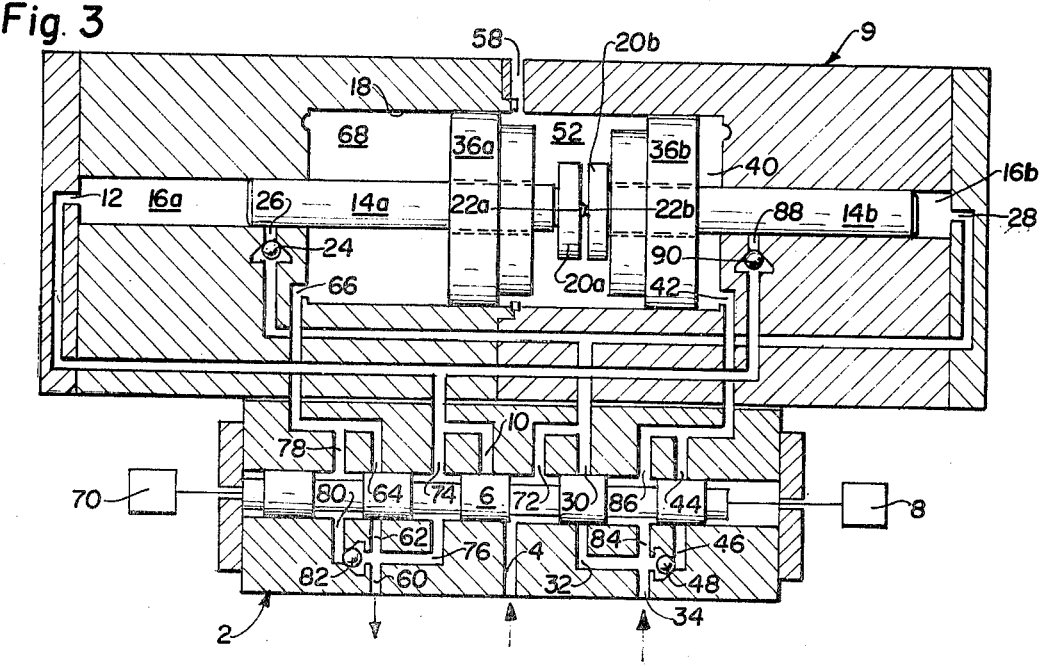

As shown in FIGURE 3, the reversing valve spool 6 is pulled and held to the left by the left solenoid 70. This operation of the reversing valve 2 and its spool 6 puts the pressurized active supply line 34 into instantaneous relief to chamber 40 (referred to above as "dispersion chamber 4"). Chamber 40 will now function as an absorption chamber, alternating from the dispersion chamber function it served just prior to the operation of the reversing valve 2.

The moment that the reversing valve 2 operates, another remote valve (not shown) closes thereby interrupting the flow of lubricant from the utility supply line to the reversing valve lubricant inlet 4. Displaced lubricant from the contraction of relieving supply line 34 continues to accumulate in (now absorption) chamber 40, moving chamber piston 36b to the left. Chamber piston 36b exerts force against the enlargement 20b of shoulder piston 14b moving it to the left. The movement of shoulder piston 14b exerts a force which is transmitted to shoulder piston 14a through protrusions 22a and 22b. Shoulder piston 14a is thereby caused to move to the left blocking port 26.

After a predetermined time, the remote shut off valve is automatically opened and pressurized lubricant from the utility supply line again enters the reversing valve at the lubricant inlet. Lubricant is directed through ports 72 and 28 to force shoulder pistons 14b and 14a further to the left. Check valve 24 stops lubricant flow toward port 26. Lubricant ahead of shoulder piston 14a is displaced through ports 12, 74 and 76 to active supply line 60. Check valve 82 prevents this lubricant from entering ports 80, 78, 66 and absorption chamber 68.

Figure 4:
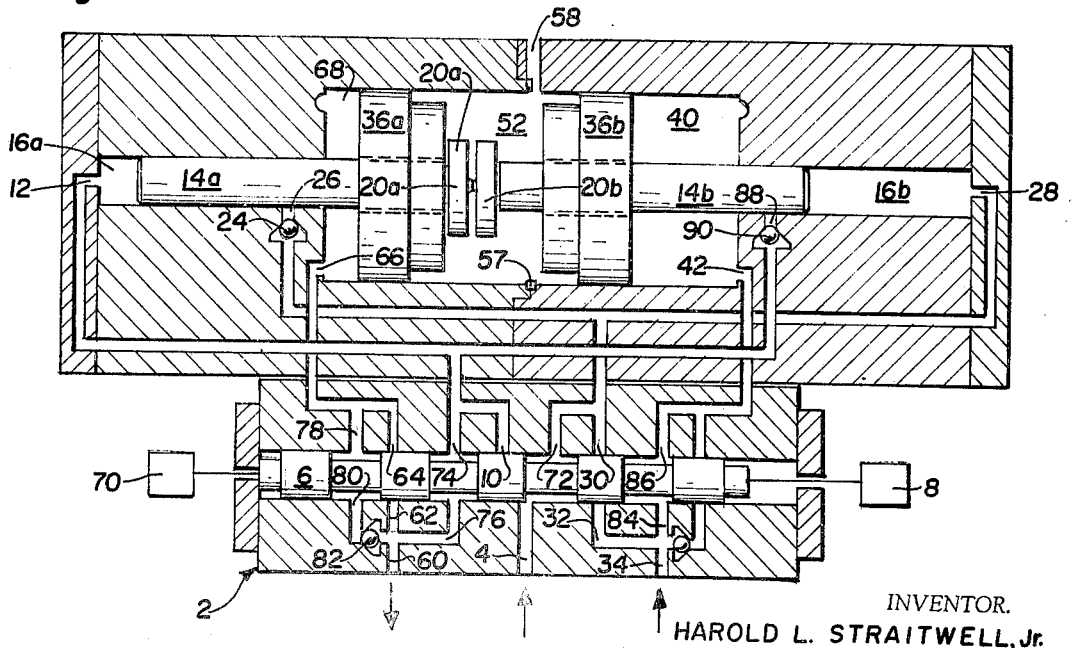

As shown in FIGURE 4, continued force of lubricant from the utility supply line forces shoulder pistons 14b and 14a to move farther to the left. The enlargement 20a of shoulder piston 14a exerts force against chamber piston 36a which moves it to the left displacing lubricant from (now dispersion) chamber 68 through ports 66, 78, 80 and check valve 82 to active system supply line 60.

System supply lines 34 remains in relief and lubricant displaced by the movement of the pilot pistons in the system measuring valves (pilot pistons are being actuated by increasing pressure in the active system supply line 60) continues to enter the reversing valve at line 34 and passes through ports 84, 86 and 42 to enter (absorption) chamber 40 moving chamber piston 36b further to the left. The travel of chamber piston 36b to the left is limited by the quantity of lubricant displaced from contraction of lubricant supply lines (not shown) and by the displaced lubricant from the system measuring valve pilot pistons (not shown).

Figure 5:
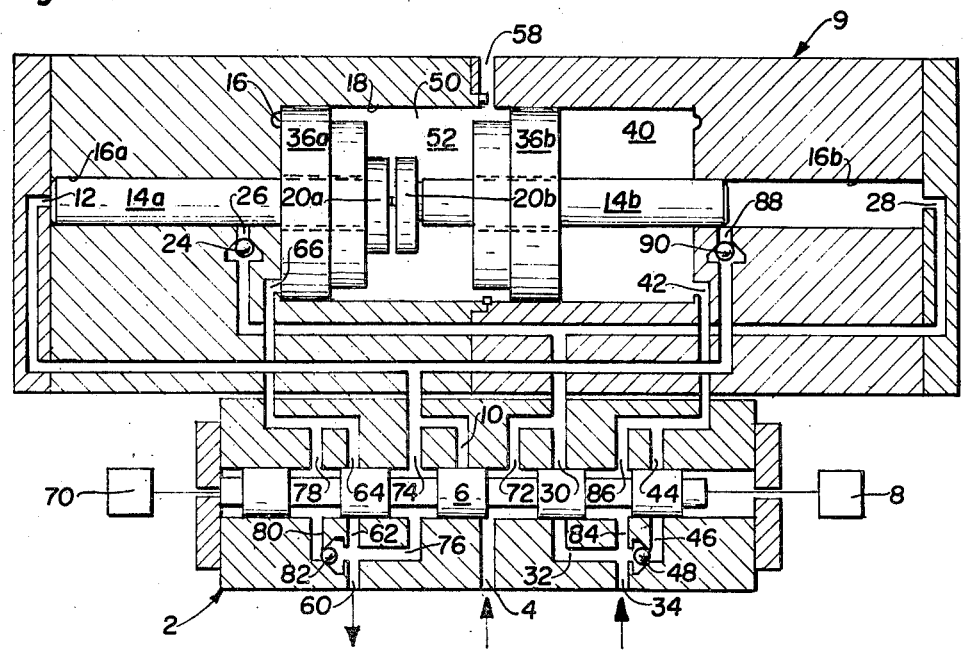

As shown in FIGURE 5, continued force of lubricant from the utility supply line moves pistons 14b, 36b and 14a to the extreme left completing the displacement of lubricant from (dispersion) chamber 68 and from the bore 16a into active system supply line 60.

Shoulder piston 14b has now exposed port 88. Utility supply lubricant is now permitted to flow through port 88, past check valve 90 and through ports 74 and 76 to active system supply line 60. The pressurized lubricant is also permitted to flow through port 12 into bore 16a to bring force against shoulder piston 14a. However, this force is countered by an equal force continued against shoulder piston 14b and thus, shoulder pistons 14a and 14b remain in their extreme left positions. Port 88 remains open and lubricant continues to bypass directly to system supply line 60. The pressurized lubricant flow is stopped by check valve 82 from entering ports 80, 78, 66 (dispersion) chamber 68. Lubricant flow to line 60 continues to service the Dualine measuring valves in the system (not shown) and their related bearing points. Line 34 remains in relief and displaced lubricant continues to flow into (absorption) chamber 40 moving chamber piston 36b further to the left. After the pressure in active system supply line 60 has reached a value high enough to insure the satisfactory operation of all the Dualine measuring valves in the system, the system reversing valve 2 again operates. Spool 6 is pulled and held to the right by the right solenoid 8. Active system supply line 60 is instantaneously put into relief to (absorption) chamber 68. The remote valve again closes, interrupting the flow of lubricant to the reversing valve 2. After the system frequency cycle timer (not shown) again signals the remote valve to open, the operating cycle and sequence of operations are repeated as outlined starting with FIGURE 1.

My invention is shown in FIGURES 1 through 5 as being controlled by a solenoid operated, two position flow reversing valve. It may also be successfully controlled by numerous other types of flow reversing valves including a solenoid operated, three position flow reversing valve and a hydraulically operated, two position flow reversing valve. By adapting the proper type of flow reversing valve, my invention can be installed in either an end of line or a loop type Dualine lubricant dispensing system.

Chambers 68 and 40 (both subchambers within chamber 52), which alternately function as absorption and dispersion chambers, have a variable volume feature with the capacity to meet changing relief demands of any size Dualine lubricant dispensing system. The variable volume feature further eliminates the need for changing the size of chambers 68 and 40 in the event of future system expansion or cut-back.

The invention assures a continuous supply of new lubricant to the bearings. It will be observed from the description of the operating sequence above that the invention disperses previously absorbed lubricant to the active system supply lines 60 and 34 before internal valve ports 26 or 88 are opened to permit additional flow of lubricant from the utility supply line to the active system feed lines.

While I have shown and described a present preferred embodiment of the invention it is to be distinctly understood that the invention is not limited thereto.

I claim:

1. An alternating absorption and dispersion valve for use in a lubricating system comprising a valve body having spaced inlet and outlet ports, a chamber within said body having varying cross-sections, passageways connecting the chamber with said inlet and outlet ports, a pair of shoulder pistons slidably positioned in abutting relationship within portions of the chamber having a smaller cross-section, and a pair of chamber pistons slidably positioned within the portion of the chamber having a larger cross-section, each such chamber piston being coaxially slidable upon a shoulder piston, said shoulder and chamber pistons being responsive to the pressure of lubricant from said inlet ports so that reciprocating movement of said shoulder and chamber pistons discharges lubricant having accumulated ahead of the leading chamber piston from a previous operation of the valve through said outlet ports and simultaneously permits variable quantities of lubricant flowing from said inlet ports to accumulate behind the trailing chamber piston.

2. An alternating absorption and dispersion valve as recited in claim 1 in which the valve body comprises left and right body members having recesses formed therein and joined at their open ends.

3. An alternating absorption and dispersion valve as recited in claim 2 in which the chamber comprises a main cylinder having venting means to the atmosphere and two opposed bores of lesser cross-section than the main cylinder extending outwardly on the axis of the main cylinder.

4. An alternating absorption and dispersion valve as recited in claim 3 in which passageways include a plurality of passages inter-connecting the remote ends of each bore with an intermediate point in its opposed bore, each said passage being connected to first inlet and outlet ports in the valve body and a plurality of passages connecting the main cylinder with second inlet and outlet ports in the valve body.

5. An alternating absorption and dispersion valve for use in a lubricating system comprising a valve body, a chamber formed within the valve body having a main cylinder and opposed bores extending outwardly from the main cylinder on a common axis, porting connecting the chamber with spaced inlet and outlet ports in the valve body and having closure means suitably disposed therein, a pair of shoulder pistons each having an enlargement formed in one end and slidably disposed within the bores whereby the enlarged ends may abut end to end, a pair of chamber pistons slidably disposed within the main chamber, each said chamber piston being coaxially fitted upon a shoulder piston whereby the sliding movement of each chamber piston is restricted in one direction by the enlarged portion of its associated shoulder piston and in the other direction by the main chamber wall, said shoulder and chamber pistons being responsive to the pressure of lubricant from said inlet ports so that reciprocating movement of said shoulder and chamber pistons discharge lubricant having accumulated ahead of the leading chamber piston from a previous operation of the valve through said outlet ports and simultaneously permits variable quantities of lubricant flowing from said inlet ports to accumulate behind the trailing chamber piston.

6. An alternating absorption and dispersing valve as recited in claim 5 in which the enlargement formed in one end of each shoulder piston comprises a flange member having a ball shaped protrusion connected to the central portion of its outer side.

7. An alternating absorption and dispersion valve as recited in claim 6 in which the closure means comprises a plurality of ball check valves.

8. A valve for use in a lubricating system and adapted to be connected to a lubricant supply comprising a body member having inlet and outlet means and exhaust means; a chamber formed in said body member; passageways communicating between said chamber and the lubricant supply; shiftable valve means for alternating between at least two positions, disposed within said chamber and responsive to the pressure of lubricant in said passageways; and means to shift said shiftable valve means, said shiftable valve means for discharging lubricant having accumulated in said chamber from a previous operation of the valve through said outlet means and simultaneously storing variable quantities of lubricant entering said chamber from said inlet means in response to actuation of said shift means to a first position and said shiftable valve means for discharging lubricant having accumulated in said chamber from a previous operation of the valve through said inlet means and simultaneously storing variable quantities of lubricant entering said chamber from said outlet means in response to actuation of said shift means to a second position.

9. A valve as recited in claim 8 wherein said valve means is piston means.

10. A valve as recited in claim 9 wherein said passageways enter said chamber adjacent the remote ends of said piston means.

11. A valve as recited in claim 10 wherein said piston means includes a first piston responsive to the pressure of lubricant in said passageways from the lubricant supply and a pair of second pistons responsive to the pressure of lubricant in said passageways from said inlet and outlet means.

12. A valve as recited in claim 11 which includes stop means for stopping said second pistons intermediate the ends of said first piston.

13. A valve as recited in claim 12 wherein, said stop means is integral with said first piston.

14. A valve for use in a lubricating system and adapted to be connected to a lubricant supply comprising a body member having inlet and outlet means and exhaust means; a chamber formed in said body member; passageways communicating between said chamber and said inlet and outlet means and between said chamber and the lubricant supply; shiftable valve means for alternating between at least two positions, disposed within said chamber and responsive to the pressure of lubricant in said passageways; and means to shift said shiftable valve means, said shiftable valve means for sequentially discharging through said passageways to said outlet means lubricant having accumulated in said chamber from a previous operation of the valve and lubricant from the lubricant supply and simultaneously storing variable quantities of lubricant entering said chamber through said passagewas from said inlet means in response to actuation of said shift means to a first position and said shiftable valve means for sequentially discharging through said passageways to said inlet means lubricant having accumulated in said chamber from a previous operation of the valve and lubricant from the lubricant supply and simultaneously storing variable quantities of lubricant entering said chamber through said passageways from said outlet means in response to actuation of said shift means to a second position.

15. In a lubricating system having a pair of alternating feed and return lines: a valve connected to said lines; means for supplying lubricant under pressure to said valve; shiftable valve means disposed within said valve for sequentially discharging through said feed line lubricant having accumulated in said valve from a previous operation thereof and lubricant entering said valve from said lubricant supply means, and simultaneously storing variable quantities of lubricant entering said valve from said return line; and reversing means connected to said valve for alternating said discharging and storing operations of said valve means in response to the alternation of said feed and return lines.

16. In a lubricating system: at least one lubricant dispensing line; at least one return line; a valve from which said dispensing line eminates and to which said return line returns; means for supplying lubricant under pressure to said valve; shiftable valve means disposed within said valve for sequentially discharging through said dispensing line lubricant having accumulated in said valve from a previous operation thereof and lubricant entering said valve from said lubricant supply means, and simultaneously storing variable quantities of lubricant entering said valve from said return line; and reversing means connected to said valve for alternating said discharging and storing operations of said valve means.

17. An alternating absorption and dispersion valve for lubricating systems comprising a housing having a first and a second bore therein and a chamber axially interposed said bores; a first and a second shoulder piston disposed in said first and second bores respectively, said pistons extending into said chamber in axially coupled relation; a first and a second chamber piston disposed on said first and second shoulder pistons respectively, said chamber pistons segregating said chamber into three distinct axially disposed subchambers, the axially remote of said subchambers surrounding said first and second shoulder pistons respectively; a first and a second passageway connected respectively to said axially remote subchambers; reversing valve means for alternately introducing and dispersing lubricant into and from each of said axially remote subchambers via each of said first and second passageways; and a supply passageway in fluid communication with said first shoulder piston to provide axial movement thereof coincident with said first passageway introducing lubricant into the subchamber connected thereto and in fluid communication with said second shoulder piston to provide axial movement thereof coincident with said second passageway introducing lubricant into the subchamber connected thereto.

18. An alternating absorption and dispersion valve for lubricant systems according to claim 17 further comprising a first and a second bore means interconnecting said first bore with said second passageway and said second bore with said first passageway thereby providing fluid communication between said supply passageway and said second passageway in response to a fixed axial movement of said first shoulder piston in one direction and providing fluid communication between said supply passageway and said first passageway in response to a fixed axial movement of said second shoulder piston in an opposing direction.

19. An absorption and dispersion valve for lubricant systems in accordance with claim 18 wherein said chamber pistons are slideable with respect to said shoulder pistons.

References Cited
UNITED STATES PATENTS

| | | | |
|---|---|---|---|
| 2,007,156 | 7/1935 | Burrell | 184—7 |
| 3,286,793 | 11/1966 | Bricout | 184—7 |

FOREIGN PATENTS

| | | |
|---|---|---|
| 248,986 | 1/1964 | Australia. |
| 1,246,294 | 10/1960 | France. |
| 910,007 | 4/1954 | Germany. |
| 102,256 | 8/1962 | Netherlands. |

FRED C. MATTERN, Jr., Primary Examiner

M. A. ANTONAKAS, Assistant Examiner

U.S. Cl. X.R.

222—249

UNITED STATES PATENT OFFICE
CERTIFICATE OF CORRECTION

Patent No. 3,497,035                                February 24, 1970

Harold L. Straitwell, Jr.

It is certified that error appears in the above identified patent and that said Letters Patent are hereby corrected as shown below:

Column 1, line 26, "system" should read -- system) --. Column 2, line 35, "them" should read -- the --; same line 35, "ain" should read -- main --. Column 3, line 69, "poiston" should read -- piston --. Column 4, line 8, "4"" should read -- 40 --; line 42, "lines" should read -- line --. Column 5, line 73, after "which" insert -- said --. Column 6, line 42, after "chamber" insert -- and said inlet and outlet means and between said chamber --.

Signed and sealed this 17th day of November 1970.

(SEAL)
Attest:

Edward M. Fletcher, Jr.                              WILLIAM E. SCHUYLER, JR.
Attesting Officer                                         Commissioner of Patents